United States Patent [19]
Pearl, II et al.

[11] Patent Number: 6,102,062
[45] Date of Patent: Aug. 15, 2000

[54] QUICK CONNECT/DISCONNECT VALVE

[75] Inventors: David S. Pearl, II, Fort Lauderdale; Frank G. Smith, Davie; Louis H. Webb, III, Dania, all of Fla.

[73] Assignee: Uniweld Products, Inc., Fort Lauderdale, Fla.

[21] Appl. No.: 09/237,467

[22] Filed: Jan. 26, 1999

[51] Int. Cl.[7] .................................................. F16L 37/28
[52] U.S. Cl. ..................... 137/1; 137/614.03; 251/149.6; 62/50.7
[58] Field of Search .................................. 137/614.03, 1; 251/149.1, 149.6, 251; 62/50.7, 292

[56] References Cited

U.S. PATENT DOCUMENTS

| | | | |
|---|---|---|---|
| 2,112,417 | 3/1938 | Farmer | 251/149.6 X |
| 2,732,166 | 1/1956 | Rayner, Jr. | 251/251 X |
| 5,005,375 | 4/1991 | Manz et al. | |
| 5,244,010 | 9/1993 | Barjasteh et al. | 137/614.03 X |
| 5,339,862 | 8/1994 | Haunhorst | 137/614.03 X |
| 5,450,875 | 9/1995 | Chichester et al. | 251/149.6 X |
| 5,603,353 | 2/1997 | Clark et al. | 137/614.03 X |

*Primary Examiner*—Kevin Lee
*Attorney, Agent, or Firm*—Nields, Lemack & Dingman

[57] ABSTRACT

A quick connect/disconnect coupler having a slidable piston to connect and disconnect to a standard fitting or coupling attached to suitable tubing. The coupling is slidably received by the coupler and locked in place by the piston. In the locked position, the coupling depresses a valve pin in the piston which opens a passageway in the coupler. At the same time, a depressor in the coupler depresses a valve stem in the coupling, thereby allowing bi-directional gas flow to the device being serviced from the service apparatus, or vice versa. A method of charging or discharging refrigeration apparatus with said coupler is also disclosed.

23 Claims, 5 Drawing Sheets

QUICK CONNECT/DISCONNECT VALVE

BACKGROUND OF THE INVENTION

Refrigeration systems, including refrigerators, air conditioning and heat pump systems, must be charged and recharged with refrigerant throughout their useful life. Refrigeration service devices, such as those which are used to service automobile air conditioning systems, generally include a vacuum pump and a refrigerant charge container. Of particular concern with refrigeration service devices is the potential for the refrigerant being transferred to escape to atmosphere, especially when the service devices are connected or disconnected from the equipment being serviced. Since many such refrigerants include fluorocarbons that pose a threat to the ozone layer, reduction or elimination of refrigerant leakage has recently become an important environmental issue.

It would therefore be desirable to provide a quick disconnect coupler that reduces or eliminates leakage and escape of refrigerant or other gases to the atmosphere during connection, operation and disconnection of the service device to the equipment being serviced.

SUMMARY OF THE INVENTION

The problems of the prior art have been overcome by the present invention, which provides a quick connect/disconnect coupler that is simple to use and easy to manufacture. The coupler uses a lever-actuated cam or other mechanism to slide a piston within a housing to connect and disconnect to a standard fitting or coupling having a predetermined configuration that is mounted to the equipment being serviced. The coupling is slidably received by the coupler and locked in place by the piston. In the locked position, the coupling depresses a valve pin in the piston which opens a passageway in the coupler. At the same time, a depressor in the coupler depresses a valve stem in the coupling, thereby allowing bi-directional gas flow between the device being serviced, such as a refrigeration device, and the service apparatus, or vice versa. A method of charging or discharging refrigeration apparatus is also disclosed. In a preferred embodiment, the refrigeration apparatus is an air conditioner, particularly an automobile air conditioner.

DETAILED DESCRIPTION OF THE INVENTION

Figure 1:
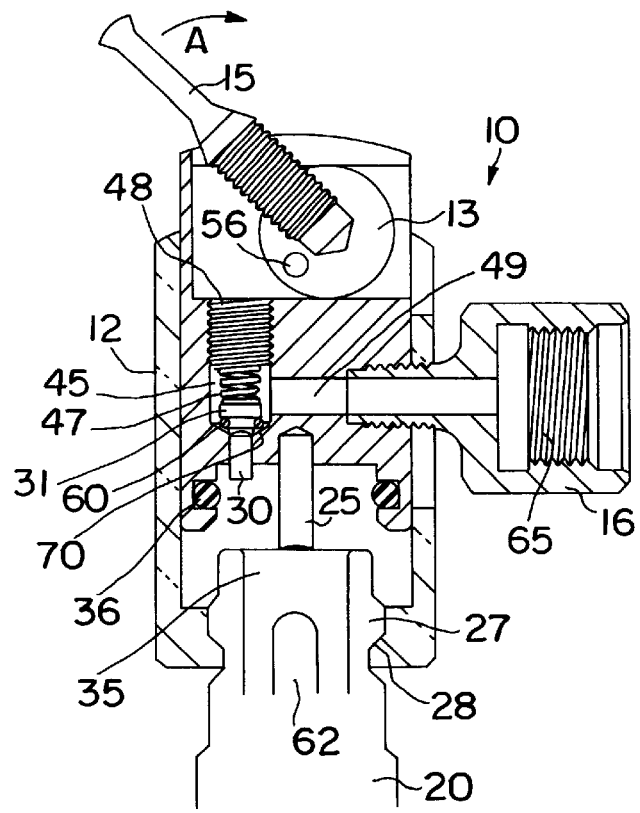
FIG. 1 is a cross-sectional view of the quick connect/disconnect coupler shown with a coupling partially inserted in accordance with the present invention.
Figure 3A:
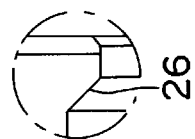
FIG. 3A is an exploded view of a portion of the outer shell of FIG. 3.
Figure 3B:
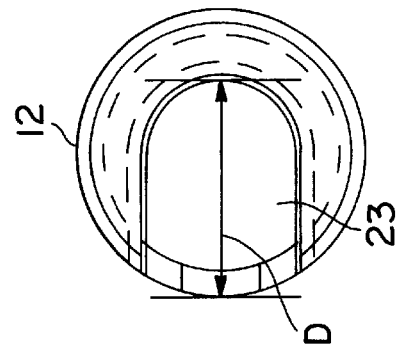
FIG. 3B is a bottom view of the outer shell of the coupler in accordance with the present invention.
Figure 3C:
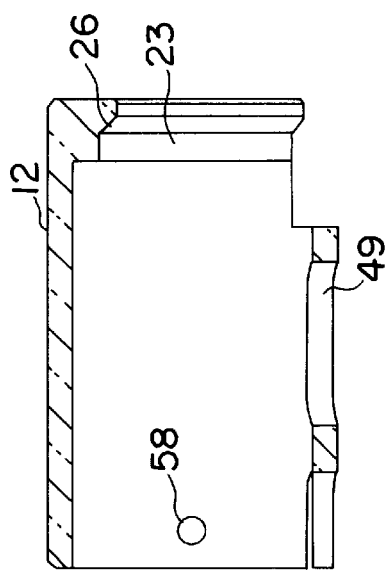
FIG. 3C is a side view of the outer shell of the coupler in accordance with the present invention.
Figure 3:
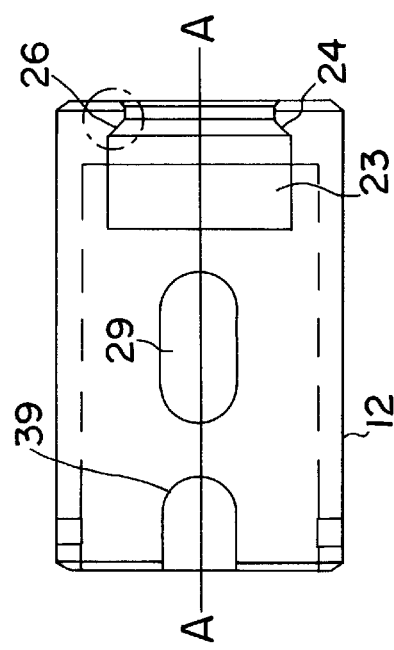
FIG. 3 is a front view of the outer shell of the coupler in accordance with the present invention.

Turning first to FIG. 1, there is shown the quick connect/disconnect coupler 10 of the present invention in the unlocked position. Suitable materials of construction include brass, aluminum and plastic, with brass being preferred. The coupler 10 includes a preferably cylindrical outer shell 12 housing a piston 14. As best seen in FIGS. 3 and 3B, the housing or outer shell 12 has a generally U-shaped cut-out 23 in its base (as the device is oriented in FIG. 1) configured to slidingly receive fitting or coupling 20. (Coupling 20 is generally of a standard industry design well known to those skilled in the art, and will not be discussed in detail herein.) Thus, in the embodiment shown the base of the outer shell 12 includes a stepped portion 24 having an annular shoulder 26 that supports a corresponding annular ridge 27 (FIG. 1) of coupling 20. The height of the cut-out 23 in the wall of the outer shell 12 is sufficient to accommodate the coupling 20 when the piston 14 is in the unlocked position. The cut-out extends radially into the outer shell 12 a distance D (FIG. 3B) such that the coupling 20 is centrally located (relative to the axis A—A (FIG. 3) when properly positioned and locked in the coupler. The wall of the outer shell 12 also includes a central slot 29 which receives inlet (or outlet, depending upon the use of the coupler) connection 16. The slot 29 is dimensioned to accommodate movement (in the vertical direction with reference to the orientation of the device shown in FIG. 1) of connection 16 attached to piston 14 when piston 14 is actuated. Connection 16 has internal threads 65 designed to receive a hose or conduit or the like that can be attached to service equipment, for example. In the preferred embodiment, outer shell 12 also includes an upper cut-out 39 in its wall which receives lever 15 of cam 13, as discussed in greater detail below.

Figure 2:
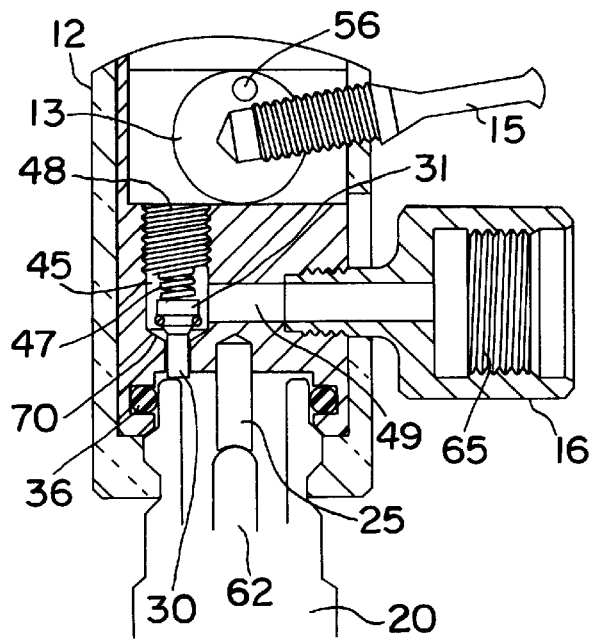
FIG. 2 is a cross-sectional view of the quick connect/disconnect coupler shown with a coupling fully inserted in accordance with the present invention.

A piston 14 is housed in outer shell 12 and is moveable therein between a first open or unlocked position (FIG. 1) and a second closed or locked position (FIG. 2). The piston 14 is preferably a solid cylindrical body having an outside diameter slightly smaller than the inside diameter of the outer shell 12. Piston 14 has a cylindrical recess or bore 33 having an annular groove 34 that houses an O-ring 36. The diameter of the bore 33 is slightly larger than the outside diameter of the engaging end 35 of the coupling 20 (FIGS. 1 and 2), such that the bore 33 surrounds the engaging end 35 of coupling 20 which seals about O-ring 36 when the piston is actuated to the locked position (FIG. 2). Those skilled in the art will appreciate that other conventional means can be used to create a seal between the coupling 20 and the piston 14, although O-ring 36 is preferred. Movement of the piston 14 into the locked position of FIG. 2 forces the annular ridge 27 of the coupling 20 against shoulder 26 of outer shell 12 as the bore 33 surrounds engaging end 35 of the coupling 20, preventing any movement of the coupling 20 until the piston 14 is released from the locked position.

Communicating with bore 33 is an aperture 40 which receives one end of depressor 25. Depressor 25 is fixed in the aperture 40 by any suitable means, such as with threads, and functions to depress the valve stem 62 in the Schrader-type valve of coupling 20 when in the locked position, as shown in FIG. 2. Thus, the configuration and location of the U-shaped recess 23 in outer shell 12 is such that the coupling 20 is positionable therein so that depressor 25 can engage the coupling valve stem 62, and so that the annular lip of coupling 20 can engage valve pin 30 in piston 14 as discussed below.

Figure 5:
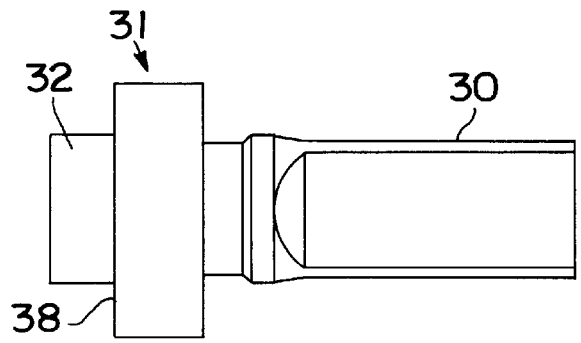
FIG. 5 is a side view of the valve pin of the coupler in accordance with the present invention.

Offset from the center of the piston 14 is an internal bore 45 that communicates with bore 33. The bore 45 includes a narrow portion 46 having an open end at bore 33. The change in internal diameter at portion 46 of bore 45 defines a valve pin seat 70. A valve pin 30 preferably shaped as a poppet, plunger or the like (FIG. 5) is housed in bore 45 and is biased against valve pin seat 70 towards bore 33 by spring 47. In the biased position, valve pin 30 occupies narrow portion 46 and extends slightly into the bore 33 as shown in FIG. 1. The valve pin 30 includes a head portion 31 with a narrower cylindrical top 32 that together forms an annular shoulder 38 to seat the lower end of spring 47. Preferably the bore 45 includes inner threads at its top portion so that it can be sealed with a threaded cap 48 that also provides a seat for the opposite upper end of spring 47 as shown in FIG. 1. The spring 47 is thus compressible between shoulder 38 and cap 48. The diameter of the head 31 is larger than the inside diameter of the lower portion 46 of bore 45, such that the valve pin 30 sits in the bore 46 and seals against the lower portion 46 with O-ring 60 when the piston 14 is in the unlocked position, due to the bias of spring 47.

The bore 45 also communicates with a lateral internal bore 49 that opens through the piston 14 outer wall. Preferably bore 49 includes internal threads 66 (FIG. 4) towards its outer end to receive corresponding threads in connection 16. The bore 33, bore 45 and bore 49 provide a sealable fluid pathway from the coupling 20 through connection 16.

Figure 4A:
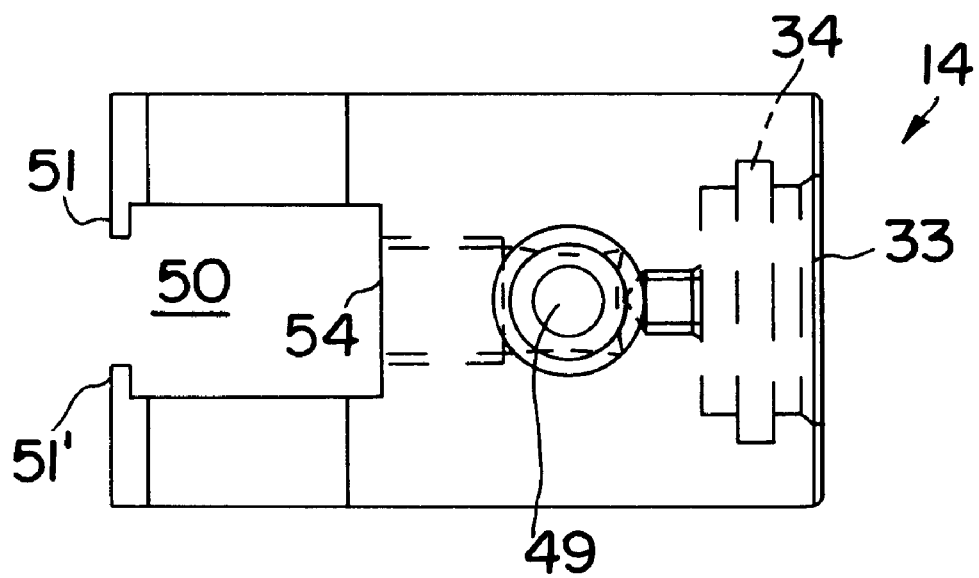
FIG. 4A is a side view of the piston of the coupler in accordance with the present invention.
Figure 4:
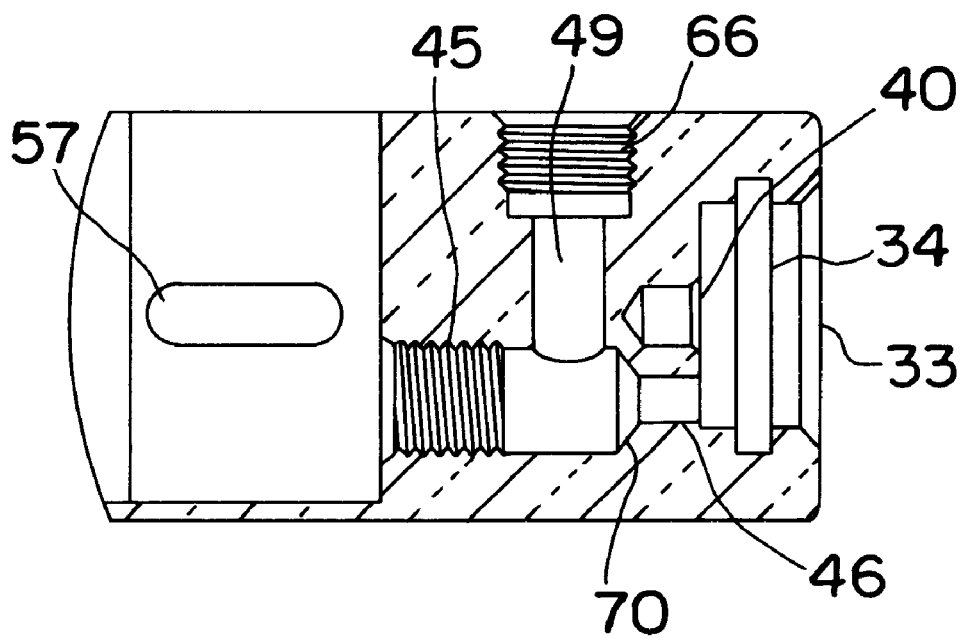
FIG. 4 is a cross-sectional view of the piston of the coupler in accordance with the present invention.
Figure 6:
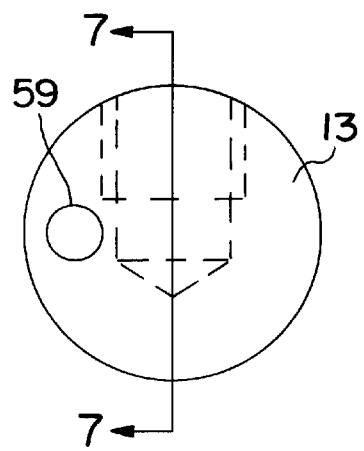
FIG. 6 is a front view of the cam of the coupler in accordance with the present invention.
Figure 7:
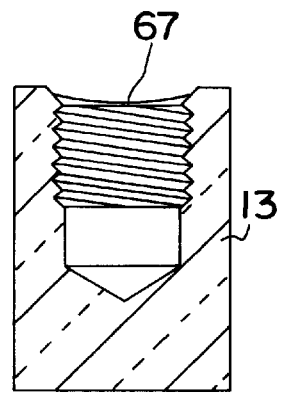
FIG. 7 is a cross-sectional view of the cam taken along line 7—7 of FIG. 6.
Figure 8:
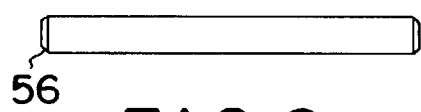
FIG. 8 is a side view of the pin for the coupler in accordance with the present invention.

In the preferred embodiment of the present invention, piston 14 includes at its end opposite bore 33 a central cut-out 50 (FIG. 4A). Preferably the cut-out 50 extends radially through the piston 14, and terminates longitudinally at one end in a narrower portion defined by opposite facing flanges 51 and 51'. The cut-out 50 is configured to house disc-shaped cam 13 (FIGS. 6 and 7) which rotates in the cut-out 50 but is prevented from moving longitudinally (i.e., with reference to the orientation of the device in FIG. 1) therein at one end by seat 54 and at the other opposite end by flanges 51, 51'. Radial (again with reference to the position of the device in FIG. 1) movement of cam 13 in cut-out 50 is prevented by pin 56 (FIG. 8) which extends through a pin hole 59 in the cam 13, through a pair of opposite slots 57, 57' (only one shown, FIG. 4) in the piston 14, and is held in opposite holes 58, 58' (only one shown, FIG. 3C) in the outer shell 12. Slots 57, 57' in piston 14 are dimensioned to accommodate movement of the pin 56 due to the rotating motion of the cam 13. Because the pin 56 is fixed to the outer shell 12, actuation of cam 13 (such as with lever 15 coupled to threaded bore 67 in cam 13) causes vertical movement (with reference to the orientation of the device in FIG. 1) of the piston 14 with respect to the outer shell 12. The pin 56 also prevents the piston 14 from completely disengaging from the outer shell 12 once assembled.

Figure 9:
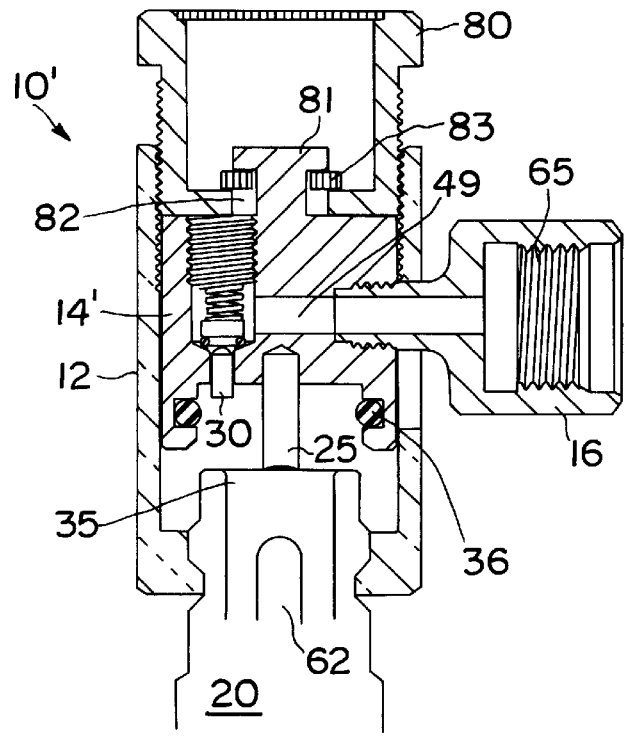
FIG. 9 is a cross-sectional view of the quick connect/disconnect coupler shown with a coupling partially inserted in accordance with an alternative embodiment of the present invention.
Figure 10:
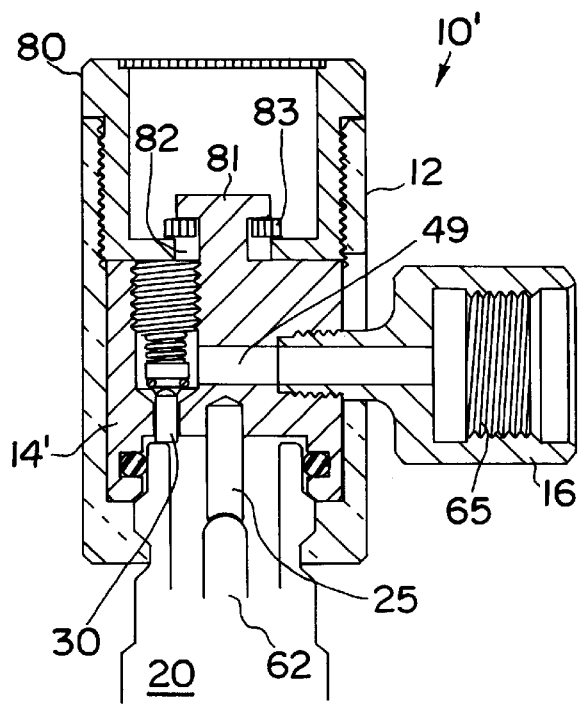
FIG. 10 is a cross-sectional view of the quick connect/disconnect coupler shown with a coupling fully inserted in accordance with an alternative embodiment of the present invention.

Those skilled in the art will appreciate that other means for moving the piston 14 with respect to the housing 12 between the unlocked and locked position can be used. For example, FIGS. 9 and 10 illustrate a coupler 10' having a cap 80. The cap 80 includes outer threads that correspond to inner threads in the housing 12. Cap 80 is coupled to piston 14', such as with a spool connection 81 extending centrally from the piston 14' through aperture 82 in the cap 80 and locked by a clip, such as C-clip 83. Clockwise rotation of the cap 80 causes it to move towards the coupling 20, which in turn forces the piston 14' towards its locked position shown in FIG. 10. Counter-clockwise rotation of the cap 80 causes it to retract in the direction away from the coupling 20 which pulls the piston to its retracted, unlocked position.

In operation, piston 14 is placed in its unlocked position, such as by positioning lever 15 of cam 13 to the left as seen in FIG. 1, or by positioning cap 80 as shown in FIG. 9. Coupling 20 (which is generally permanently attached or attachable to the equipment being serviced) is slidingly positioned within bore 33 of outer shell 12 so that annular ridge 27 of coupling 20 seats against the annular shoulder 26 of cut-out 23. Lever 15 is then actuated in the direction of arrow A in FIG. 1 into the recess 39 to the locked position of FIG. 2, which actuates cam 13 (or cap 80 is turned clockwise in the embodiment of FIG. 9) and causes piston 14 to move (with respect to outer shell 12) to the locked position. With the piston 14 now in the locked position, depressor 25 engages and depresses the valve stem 62 in coupling 20, opening the valve. Also with the piston 14 in the locked position, the lip of coupling 20 presses against valve pin 30, forcing the valve pin 30 against the bias of spring 47, unsealing the valve pin 30 from the valve seat 70. This provides fluid communication between bore 33, bore 45 and bore 49, thereby allowing fluid to flow either from coupling 20 through connection 16, or from connection 16 through coupling 20. (Connection 16 can be coupled, via suitable tubing or the like, to e.g., refrigeration manifold apparatus, a vacuum pump, a source of test or purge gas such as nitrogen, etc.) Coupling 20 cannot be disengaged from the device until the cam is actuated back to the position shown in FIG. 1 (or the cap 80 is actuated back to the position shown in FIG. 9), causing the piston to retract to the unlocked position and allowing sliding disengagement of the coupling 20 from the outer shell 12. In addition, the valve pin 30 prevents refrigerant (or other fluid in use) from flowing when the coupling 20 is removed, even if the piston 14 is in the locked position, since the valve pin 30 must be activated (i.e., urged against the bias of spring 47) to unseal it from valve seat 70 for fluid to flow.

Those skilled in the art will appreciate that the quick connect/disconnect coupler of the present invention is suitable for use both at the high pressure and low pressure sides of the equipment compressor, although the particular size (e.g., diameter) of the couplers may vary depending upon the use.

What is claimed is:

1. Quick connect/disconnect coupler device, comprising:
   an outer shell for receiving a coupling;
   a piston positioned within said outer shell and moveable with respect to said outer shell, said piston comprising a bore configured to seal about said coupling, and a fluid pathway in fluid communication with said bore, said fluid pathway comprising a valve pin having a first position sealing said fluid pathway from said bore and a second position allowing fluid communication between said bore and said pathway, said valve pin extending into said bore when in said first position; and
   means for causing said piston to seal about said coupling, thereby forcing said valve pin into said second position.

2. The quick connect/disconnect coupler of claim 1, wherein said piston further comprises a recess, and wherein said means for causing said piston to seal about said coupling comprises a moveable cam in said recess.

3. The quick connect/disconnect coupler of claim 1, wherein said means for causing said piston to seal about said coupling comprises a threaded cap rotatable in said outer shell.

4. The quick connect/disconnect coupler of claim 1, wherein fluid pathway comprises a valve pin seat, and wherein said valve pin is biased against said valve pin seat.

5. The quick connect/disconnect coupler of claim 1, wherein said piston is moveable with respect to said outer shell between a first unlocked position and a second locked position.

6. The quick connect/disconnect coupler of claim 5, wherein said valve pin is in said first position sealing said fluid pathway when said piston is in said unlocked position.

7. The quick connect/disconnect coupler of claim 5, wherein said valve pin is in said second position when said piston is in said locked position.

8. A quick connect/disconnect coupler for attachment to a coupling, said coupler comprising:

a housing;

a piston within said housing, said piston being moveable with respect to said housing between an unlocked position and a locked position, said piston comprising a recess for receiving said coupling; and valve means in said piston, said valve means being moveable with respect to said piston between a closed position when said piston is in said unlocked position and an open position when said piston is in said locked position, said valve means extending into said recess when in said closed position.

9. The quick connect/disconnect coupler of claim 8, wherein said piston further comprises a recess housing a cam for moving said piston within said outer shell.

10. The quick connect/disconnect coupler of claim 8, wherein said coupler couples to a fitting having a valve stem, and wherein said piston further comprises a depressor for depressing said valve stem and causing fluid to flow from said fitting to said coupler.

11. The quick connect/disconnect coupler of claim 8, wherein said valve means comprises a valve pin.

12. The quick connect/disconnect coupler of claim 11, wherein said valve pin comprises a poppet.

13. The quick connect/disconnect coupler of claim 8, further comprising a cap threaded in said housing for moving said piston.

14. A method of coupling a fitting having an annular collar and a valve stem to a coupler, comprising:

providing a coupler having a housing and a piston in said housing and moveable with respect thereto between an unlocked position and a locked position, said housing having a bore configured to receive said fitting, said piston having a valve stem depressor, a fluid passageway having a valve seat, and a valve pin resiliently biased against said valve seat;

positioning said fitting in said bore of said housing;

moving said piston with respect to said housing from said unlocked position to said locked position, thereby causing said valve stem depressor to engage said valve stem and said annular collar of said fitting to engage said valve pin, urging said valve pin against said bias thereby opening said fluid passageway.

15. The method of claim 14, wherein said fitting is positioned in said bore by sliding.

16. The method of claim 14, wherein said piston further comprises a recess housing a cam, and wherein said piston is actuated from said unlocked position to said locked position by moving said cam.

17. The method of claim 14, further comprising providing a cap threaded in said housing, and wherein rotation of said cap causes said piston to move.

18. A method of charging refrigeration apparatus with refrigerant, comprising:

providing a coupler having a housing and a piston in said housing and moveable with respect thereto between an unlocked position and a locked position, said housing having a bore, said piston having a valve stem depressor, a fluid passageway having a valve seat, and a valve pin resiliently biased against said valve seat;

positioning a fitting adapted to be connected to said refrigeration apparatus in said bore of said housing, said fitting having an annular collar and a valve stem;

moving said piston with respect to said housing from said unlocked position to said locked position, thereby causing said valve stem depressor to engage said valve stem and said annular collar of said fitting to engage said valve pin, thereby urging said valve pin against said bias and opening said fluid passageway;

causing said coupler to be in communication with a source of refrigerant;

causing refrigerant to flow from said source of refrigerant through said fluid passageway, through said fitting and into said refrigeration apparatus.

19. The method of claim 18, further comprising moving said piston with respect to said housing from said locked position to said unlocked position, thereby causing said valve pin to seal against said valve seat so as to close said fluid passageway; and removing said fitting from said coupler.

20. A method of coupling, with a coupler, service equipment to apparatus to be serviced, comprising:

providing a fitting having a predetermined configuration in fluid communication with said apparatus to be serviced;

providing a fluid passageway in fluid communication with said service equipment, said fluid passageway being adapted to be removably sealingly coupled to said coupler, said coupler comprising a housing with respect to which a piston is moveable between a first position and a second position, said housing having a bore configured to receive said predetermined configuration of said fitting and receiving means for sealingly receiving said fluid passageway, said piston having a recess and a moveable cam in said recess;

positioning said fitting in said bore of said housing; and actuating said moveable cam to cause said piston to move to said second position, thereby locking said fitting in said housing.

21. The method of claim 20, wherein said piston further comprises a valve pin moveable between an open position and a closed position, and wherein said step of causing said piston to move to said second position causes said fitting to engage said valve pin and move said valve pin to said open position.

22. The method of claim 21, wherein said valve pin is biased toward said closed position by a spring.

23. The method of claim 20, wherein said piston further comprises a valve stem depressor and said fitting further comprises a valve stem, and wherein said step of causing said piston to move to said second position causes said valve stem depressor to engage said valve stem.

* * * * *